C. FORTH.
CLAMPING DEVICE FOR GASKETS AND THE LIKE.
APPLICATION FILED NOV. 24, 1911.

1,035,566. Patented Aug. 13, 1912.

Attest:

Inventor:
Charles Forth
by Rogers, Kennedy & Campbell Attys

UNITED STATES PATENT OFFICE.

CHARLES FORTH, OF BOSTON, MASSACHUSETTS.

CLAMPING DEVICE FOR GASKETS AND THE LIKE.

1,035,566.  Specification of Letters Patent.  Patented Aug. 13, 1912.

Application filed November 24, 1911. Serial No. 662,085.

*To all whom it may concern:*

Be it known that I, CHARLES FORTH, a citizen of the United States, residing at Boston, in the county of Suffolk and State of Massachusetts, have invented certain new and useful Improvements in Clamping Devices for Gaskets and the Like, of which the following is a specification, reference being had therein to the accompanying drawing.

This invention relates to a clamping device for securing gaskets and the like removably in place, and the invention is designed with special reference to its application in connection with pipe couplings in which the parts or heads to be coupled together are provided with ports surrounded by gaskets which, when the heads are coupled face to face, will be compressed against each other and in this way will form a fluid-tight joint between the parts. In the use of couplings of this character, it is important that the gaskets be held firmly and tightly seated in the heads, while at the same time they be capable of convenient application to or removal from the heads; and to provide for these conditions, I form the head with an annular surface or ledge surrounding the port, on which surface the gasket is seated, and I provide a clamping ring which is adapted to engage the gasket, the said clamping ring being so mounted in the head that, while it will be separated from the annular gasket seat to permit the gasket to be readily inserted, onto its seat from the inside of the head, the ring may be forced down on the gasket, and in this way clamp the latter firmly in place.

Figure 1:
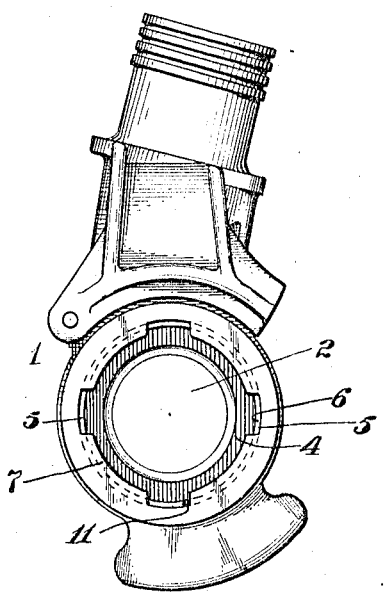
Figure 2:
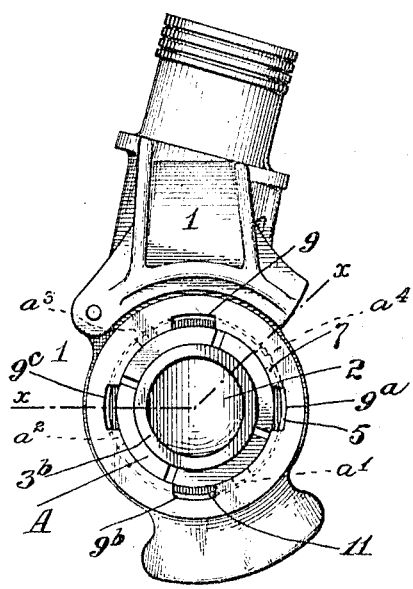
Figure 4:
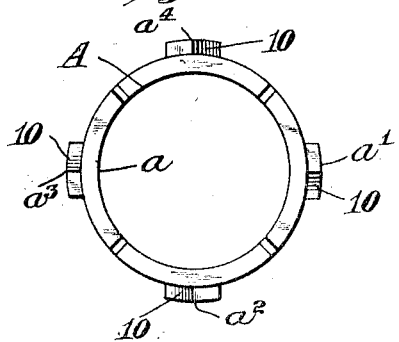
Figure 3:
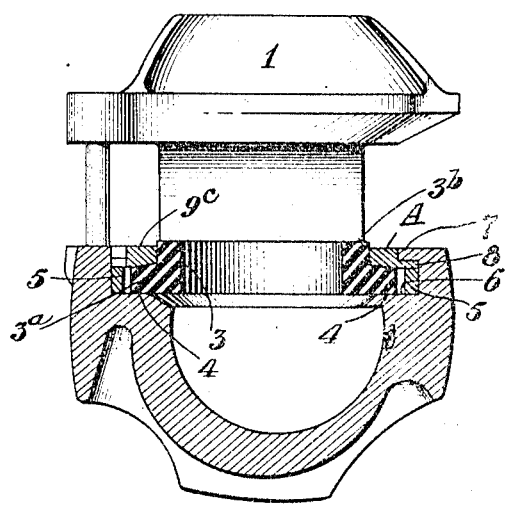
Figure 5:

In the accompanying drawings: Figure 1 is a face view of a coupling head formed in accordance with my invention, the clamping ring being removed therefrom to expose other parts to view. Fig. 2 is a similar view showing the gasket clamped by the ring to its seat. Fig. 3 is a transverse section through the same, on the line $x$—$x$ of Fig. 2. Fig. 4 is a plan view of a clamping ring removed. Fig. 5 is an edge view of the same.

Referring to the drawings, 1 represents one of the coupling heads of a pipe coupling to which, by way of example, I have shown my invention applied. This head is shown as provided with a port 2 through the fluid passes to a similar port in a complementary head not here shown. The port 2 is surrounded by a gasket 3 in the form of a rubber ring having a base flange $3^a$ and a longitudinally extending portion $3^b$, the said gasket being so mounted in the head that the portion $3^b$ will project beyond the face of the same so that, when the two heads are coupled together face to face, the projecting ends of the gaskets will meet and be compressed against each other, and in this way will form a liquid-tight joint between the heads. It is important that the gasket be confined tightly in the head in order to prevent the escape of fluid around the base of the gasket, while at the same time it may be capable of quick and easy removal from and application to the head; and to provide for these conditions, I form the head with an inwardly extending ledge 4 surrounding the port 2, on which ledge the base flange of the gasket is adapted to be seated and tightly clamped by means of a clamping ring A more fully described later on. Adjoining the ledge 4 is a cylindrical surface 5, and adjoining the surface 5 and arranged in a plane parallel with the plane of the ledge 4, is an annular shoulder 6 by which the clamping ring is spaced from the gasket seat, as will be presently described. A flange 7 projects inwardly from the face of the head and overhangs the shoulder 6, so that a space 8 is left between the inner face of the flange and the face of the shoulder, this flange being cut away or notched at intervals, as at 9, $9^a$, $9^b$ and $9^c$, to the depth of the shoulder 6. The clamping ring A before alluded to is shown more particularly in Figs. 4 and 5, and consists of a body portion $a$, which is adapted to fit loosely within the inner edge of the flange 7, and has a series of lugs, four in the present instance, $a'$, $a^2$, $a^3$, and $a^4$, projecting from the edge of the ring, which lugs are adapted to extend into the space 8 between the flange 7 and the shoulder 6, the notches 9, $9^a$, etc., being of a length circumferentially to permit of the passage therethrough of the lugs; whereby the ring may be assembled in operative position in the head with the lugs projecting into the space 8. The outer faces of the lugs are cammed or beveled as at 10, which beveled surfaces are adapted to coöperate with the inner side of the flange 7 when the ring is turned to carry the lugs into the space 8, the result being that the ring will be forced down tightly and firmly toward the gasket seat, and will compress and clamp the flange of the gasket against its seat and thus clamp the gasket firmly and tightly in place.

In assembling the clamping ring in the head in operative position, the lugs on the ring are passed through the respective notches in the flange 7 and the ring turned slightly forward in the direction of the arrow in Fig. 2, so as to carry the forward ends of the lugs beneath the portions of the flange adjacent the several notches. A pin or stop 11 is then inserted between the rear end of one of the lugs and the adjacent wall of the notch for that lug, the size of the pin being such that it will prevent the ring from being turned back far enough to permit the lugs to pass outwardly through the notches, so that the ring is retained in place in the head and prevented from accidental escape therefrom, the lugs, by resting on the shoulder 6, spacing the ring from the gasket seat a distance to permit the gasket to be freely and readily set in place on the seat between the same and the inner face of the ring. As a result of this construction and arrangement of the parts, the clamping ring cannot fall inwardly on the gasket seat and offer an obstruction to the insertion of the gasket; nor is it possible for the clamping ring to escape from the head or become lost, and in this way cause the coupling to become inoperative. The pin or stop 11 is preferably made removable, so that the clamping ring may be detached from the head when it is desired to do so.

In securing the gasket in place, the clamping ring is first moved to a position where the end of the lug $a'$ will contact with the stop or pin 11, in which position the ring is supported loosely some distance from the gasket seat. The gasket is then set on its seat between the same and the inner face of the ring, whereupon the latter is turned in the direction of the arrow in Fig. 2. This action will cause the cammed faces of the lugs to bear against the inner face of the flange 7, and will force the ring bodily down on the base flange of the gasket, thereby clamping the same firmly and fixedly to its seat. When the gasket is to be removed, the ring is turned back to its former position, thus releasing the flange of the gasket from clamping pressure, whereupon the gasket may be readily drawn out from the port in the head.

The shoulder 6 which sustains the clamping ring spaced from the gasket seat, may be formed integral with the head, or it may be constructed as a separate ring $6^a$ and sprung into place on the gasket seat at its outer portion. In this form of the shoulder 6, the clamping ring will be given more latitude of clamping movement against the gasket.

In the accompanying drawings and foregoing description I have set forth my invention in the specific form which I prefer to employ. It is manifest to the skilled mechanic that various changes may be made therein without departing from the limits of my invention, and it is to be understood that the invention is not to be limited to any particular form or construction of the parts, except in so far as such limitations are specified in the claims.

Having thus described my invention, what I claim is:

1. In combination with a coupling head provided with a port and a surrounding gasket seat, an annular shoulder surrounding the seat, a flange overhanging the shoulder and forming in connection therewith an annular recess, and a clamping ring provided with lugs projecting into the recess and acting in connection with the annular shoulder to sustain the ring spaced from the gasket seat, while admitting of a limited free play of the ring toward the seat to clamp the gasket, the said lugs being so formed that by a partial turn of the ring they will coöperate with the overhanging flange in taking up the play of the ring, and will force the latter toward the gasket seat.

2. In combination with a head provided with a port and surrounding gasket seat, and having an annular space adjacent the seat, said space having its outer wall notched, a clamping ring provided with a lug adapted to pass freely through the notch and enter said space, the said ring being movable circumferentially to clamp or release the gasket, and a removable stop in position to be encountered by the lug and acting to limit its circumferential movement so as to prevent the lug from registering with the notch; whereby, while the clamping ring is capable of sufficient circumferential movement to clamp and release the gasket, it will be prevented from moving far enough to be detached from the head.

In testimony whereof I affix my signature in presence of two witnesses.

CHARLES FORTH.

Witnesses:
FRANK G. PARKER,
JOHN BUCKLER.